United States Patent Office 3,681,141
Patented Aug. 1, 1972

3,681,141
PROCESS FOR CLEANING HARD SURFACES
Erland L. Muoio, Racine, Wis., assignor to
S. C. Johnson & Son, Inc., Racine, Wis.
No Drawing. Continuation of abandoned application Ser.
No. 687,440, Dec. 4, 1967. This application Dec. 17,
1970, Ser. No. 99,320
Int. Cl. C23g 1/02
U.S. Cl. 134—41                                       6 Claims

ABSTRACT OF THE DISCLOSURE

The disclosure relates to a process for cleaning hard surfaces such as the porcelain and enamel surfaces of sanitary ware which are in contact with water. Cleaning is effected by applying to such surfaces a viscous, fluid composition consisting essentially of water, a mineral acid and a water-soluble synthetic organic polymer. Optional additional ingredients may also be present. The cleaning compositions readily wet the surface to be cleaned and form a uniform, continuous sheet of active material below the water line.

This application is a continuation of Muoio U.S. Ser. No. 687,440, filed Dec. 4, 1967, now abandoned.

BACKGROUND OF THE INVENTION

Field of the invention

This invention relates to novel compositions for cleaning hard surfaces in contact with water and to the process for cleaning the same.

Description of the prior art

It is known that various articles of sanitary ware which are in continuous contact with water develop stains during use from waste products and from water-borne staining agents such as metal oxides and salts. The articles of sanitary ware, such as toilets, urinals or the like are typically coated with a porcelain or enamel finish which becomes somewhat porous with time. Thus, the stains which develop can and do penetrate into the finish and are difficult to remove.

It has been proposed to remove such stains by the use of strong acid cleaners. However, the acid cleaners heretofore employed present a number of serious problems. The surfaces to be cleaned are generally more-or-less vertical and are also in contact with water. Accordingly, liquid acid cleaners are rapidly dispersed throughout the body of the water contained in the sanitary ware and are not concentrated on the porcelain or enamel surface which is to be cleaned. This undesirable dilution of the acid cleaner by the water greatly reduces its effectiveness and requires that it be used in a highly concentrated form, thus increasing the hazards associated with handling it. Solid acid cleaners do not eliminate these problems since the solid does not adhere to the almost vertical surfaces and merely falls to the bottom of the sanitary ware, where it dissolves slowly. As a result of the foregoing deficiencies, the cleaning of sanitary ware which is in contact with water has been a time-consuming and hazardous operation requiring a considerable degree of care and manual scrubbing.

SUMMARY OF THE INVENTION

It is an object of this invention to provide a novel process for cleaning hard surfaces in contact with water. It is a further object to provide novel cleaning compositions for use in said process. Other objects will be apparent to those skilled in the art from the following description.

In accordance with the practice of this invention, hard surfaces in contact with water are cleaned by applying to said surfaces a fluid, viscous composition comprising a strong mineral acid selected from the group consisting of hydrochloric acid, sulfuric acid and phosphoric acid and a water soluble organic polymer, preferably polyvinyl alcohol. The novel compositions of this invention are acid cleaning compositions consisting essentially of water, a strong mineral acid selected from the group consisting of hydrochloric acid, sulfuric acid and phosphoric acid, and a water soluble organic polymer, preferably polyvinyl alcohol.

The process of the invention provides a highly convenient and rapid means for cleaning sanitary ware. The composition described is applied, for example by spraying, around the surface of the sanitary ware, preferably just above the water line. The composition, because of its fluidity, viscosity and ability to wet hard surfaces, forms a continuous sheet over the entire surface and flows uniformly down the sides of the sanitary ware. Thus, the entire surface to be cleaned is coated and the acid cleaner is concentrated on the surface to be cleaned rather than dispersed throughout the water contained in the sanitary ware. For these reasons, the cleaner can be applied in less concentrated form than prior art cleaners, yet it effectively cleans the surface in a very short time. When desired, it is very easily rinsed away to leave a clean, sparkling surface.

The cleaning composition will contain at least one mineral acid, the function of which is to remove acid-soluble stains such as iron oxides, calcareous deposits, etc. The acids which can be employed include hydrochloric acid, sulfuric acid and phosphoric acid. Either the acid, itself, or water-soluble acidic salts, e.g. sodium bisulfate can be employed. Mixtures of two or more acids can be employed, if desired. Hydrochloric acid is preferred. Typically, the amount of acid employed will range from about 6 to about 35% by weight and preferably from about 10 to about 25% by weight of the total composition.

The composition will also contain an organic polymer which is both soluble and stable in high acid media. The polymers found to be most desirable are synthetic organic polymers selected from the group consisting of polyvinyl alcohol and polyethylene glycol. In order to provide the fluidity and viscosity desired for practice of the invention, the final composition will generally have a viscosity between about 5 and 50 centipoises and preferably between 5 and 20 centipoises. Accordingly, the polymers employed should be of sufficient molecular weight to provide that viscosity when used in a suitable concentration, say less than about 20% by weight of the composition. Most preferably, the polymer will be used at a concentration between about 0.5 and 10% by weight. Mixtures of two or more organic polymers can be employed, if desired.

The preferred organic polymer is polyvinyl alcohol, and most preferably a completely hydrolyzed, high molecular weight polyvinyl alcohol such as that sold under the trademark Elvanol EP77-500M. High molecular weight polyvinyl alcohols are those having an average molecular weight of about 35,000 to 200,000. These polymers can be used at very low concentrations of the order of about 1% to produce the desired viscosity and fluidity and have especially good acid stability and wetting characteristics and provide compositions having outstanding resistance to dispersion in the water contained in the sanitary ware to be cleaned.

In addition to the foregoing, the cleaning composition may contain one or more wetting agents to improve its cleaning and wetting ability. Any wetting agent used should be stable in the presence of the acid employed. If used, the total quantity of wetting agent will be comparatively small, e.g. not in excess of about 8% by weight and preferably about 1 to 4% by weight. The preferred wetting agents are nonionic surfactants, and preferably polyethoxylated surfactants such as the ethoxylated alkyl phenols.

The composition may also include one or more water-soluble alkylene glycols such as ethylene glycol or propylene glycol. Alkylene glycols tend to improve the spreading characteristics of the composition and the residual gloss left on the cleaned surface. When used, the alkylene glycol will not normally exceed about 10% weight of the composition and preferably will constitute about 0.5-5% by weight.

Other optional components which can be added to the formulations to contribute specific characteristics or enhance esthetic appeal include dyes, fragrances and disinfectants, preferably quaternary ammonium disinfectants. The balance of the composition will be water.

Although the process for preparing the composition is not critical, the following procedure is found to be convenient. First, the organic polymer is dissolved in the water. In the case of the preferred polyvinyl alcohols, the polymer is dispersed in the water at a low temperature, then heated almost to boiling with good agitation to complete the dissolution. The solution is then cooled and the remaining components are added. Cleaning compositions prepared in accordance with this invention are stable in storage and retain their novel characteristics for long periods of time.

The compositions are preferably packaged in a container which is designed to facilitate their application. Because of their acidic nature, the compositions are generally not placed in metal containers. A highly convenient and efficient container is a flexible plastic squeeze bottle fitted with a directional spray orifice which permits accurate spraying of a stream of the composition on the surface of the article to be cleaned.

The following examples illustrate practice of certain specific embodiments of the invention. It will be understood that the invention is not limited to the specific materials and proportions given, but comprehends all such modifications and variations thereof as will be apparent to those skilled in the art.

EXAMPLE I

An acid cleaning composition is prepared from the following components in the amounts recited, in parts by weight.

| | |
|---|---|
| Polyvinyl alcohol [1] | 1.00 |
| Wetting agent [2] | 4.00 |
| Disinfectant [3] | 0.50 |
| Propylene glycol | 1.00 |
| Dye [4] | 0.01 |
| Fragrance | 0.50 |
| Hydrochloric acid (18° Bé.–25% HCl) | 53.00 |
| Water | 39.00 |

[1] Completely hydrolyzed, high molecular weight polyvinyl alcohol sold under the trademark Elvanol EP77–500M.
[2] Nonyl phenol-ethylene oxide adduct containing about 9.5 moles of ethylene oxide per mole of nonyl phenol.
[3] A 50:50 mixture of n-alkyl dimethyl benzyl ammonium chloride and n-alkyl diethyl benzyl ammonium chloride. The alkyl groups in the former comprise 60% $C_{14}$, 30% $C_{16}$, 5% $C_{12}$, and 5% $C_{18}$; the alkyl groups in the latter comprise 50% $C_{12}$, 30% $C_{14}$, 17% $C_{16}$, and 3% $C_{18}$.
[4] Alizarine blue GR 150%, 1% solution in water.

The polyvinyl alcohol is dispersed in the water at room temperature and the mixture is heated, with stirring, to about 95° C. and held at that temperature for about one hour. The solution is then cooled to room temperature and the other ingredients are added and thoroughly mixed. The resulting composition has a viscosity of about 5-20 centipoises at room temperature.

The composition is poured into a plastic squeeze bottle which is then fitted with a directional spray orifice capable of spraying a thin stream. The squeeze bottle is inverted over a toilet bowl whose surface is heavily marked with iron stains and a stream of cleaner is directed against the surface of the bowl in a complete circle, just above the water line. The location of the cleaner is readily observed because of the presence of the blue dye. It is found that the cleaner flows uniformly down the sides of the bowl and forms a continuous sheet over the entire surface below the water line. The cleaner is allowed to work for about 2-10 minutes, during which time there is little dispersion of the cleaner throughout the water and the active material remains in close contact with the bowl surface. The toilet is then flushed, whereupon the cleaner is quickly rinsed from the bowl surface to leave a clean, sparkling, stain-free finish. Similar results are obtained when equivalent quantities of phosphoric acid or sulfuric acid are substituted for the hydrochloric acid.

EXAMPLE II

A cleaning composition is prepared from the following components in the amounts recited, in parts by weight:

| | |
|---|---|
| Polyvinyl alcohol [1] | 12.00 |
| Ethylene glycol | 3.00 |
| Dye [2] | 2.00 |
| Fragrance | 0.50 |
| Hydrochloric acid (23° Bé.–38% HCl) | 52.50 |
| Water | 30.00 |

[1] Completely hydrolyzed, medium molecular weight polyvinyl alcohol sold under the trademark Elvanol 75–6000.
[2] As in Example 1.

The procedure followed is the same as that of Example I. The product is a viscous, fluid liquid which, when applied to a bowl surface in contact with water, forms a continuous, uniform sheet over the entire surface below the water line.

EXAMPLE III

A cleaning composition is prepared from the following components in the amounts recited, in parts by weight:

| | |
|---|---|
| Polyvinyl alcohol [1] | 15.00 |
| Hydrochloric acid (23° Bé.–38% HCl) | 55.00 |
| Water | 30.00 |

[1] Partially hydrolyzed, medium molecular weight polyvinyl alcohol sold under the trademark Elvanol EP 55–1500.

The procedure followed is the same as that of Example I except that heating is not required to dissolve the polyvinyl alcohol. The product is a viscous, fluid liquid which, when applied to a bowl surface in contact with water, forms a continuous, uniform sheet over the entire surface below the water line. Its resistance to dispersion in the water reservoir is not, however, as good as the product of Example I.

EXAMPLE IV

A cleaning composition is prepared from the following components in the amounts recited, in parts by weight:

| | |
|---|---|
| Polyethylene glycol (20,000 molecular wt.) | 6.00 |
| Propylene glycol | 1.00 |
| Fragrance | .50 |
| Dye [1] | .01 |
| Wetting agent [1] | 4.00 |
| Water | 34.99 |
| Hydrochloric acid (18° Bé.–25% HCl) | 53.00 |
| Disinfectant [1] | .50 |

[1] As in Example 1.

The product is a viscous, fluid liquid which, when applied to a bowl surface in contact with water, forms a continuous, uniform sheet over the entire surface below the water line.

I claim:

1. A process for cleaning a hard surface in contact with water, which process comprises spraying on said surface a viscous, fluid cleaning composition having a viscosity between about 5 and 50 centipoises and consisting essentially of water; from about 0.5 to about 20 percent by weight, of at least one water-soluble organic polymer selected from the group consisting of polyvinyl alcohol having a molecular weight from about 35,000 to 200,000 and polyethylene glycol having a molecular weight of 20,000; and from about 6 to about 35 percent, by weight, of at least one mineral acid selected from the group consisting of hydrochloric acid, phosphoric acid, and sulfuric acid, wherein said composition contacts said surface below the water line.

2. A process as defined by claim 1 wherein said composition contains a non-ionic wetting agent.

3. A process as defined by claim 1 wherein said composition contains ethylene glycol or propylene glycol.

4. A process as defined by claim 1 wherein said polyvinyl alcohol is a high molecular weight, completely hydrolyzed polyvinyl alcohol.

5. A process as defined by claim 1 wherein said mineral acid is hydrochloric acid.

6. A process for cleaning a hard surface in contact with water, which process comprises spraying on said surface a viscous, fluid cleaning composition having a viscosity between 5 and 20 centipoises and consisting essentially of water; from about 0.5 to about 10 percent by weight, of at least one water-soluble organic polymer selected from the group consisting of polyvinyl alcohol having a molecular weight from about 35,000 to 200,000 and polyethylene glycol having a molecular weight of 20,000; and from about 10 to about 25 percent by weight, of at least one mineral acid selected from the group consisting of hydrochloric acid, phosphoric acid, and sulfuric acid, wherein said composition contacts said surface below the water line.

References Cited
UNITED STATES PATENTS

| | | | |
|---|---|---|---|
| 2,257,467 | 9/1941 | Jacobson | 252—185 |
| 3,271,319 | 9/1966 | Morrison | 252—142 |
| 3,511,707 | 5/1970 | La Flamme | 134—3 |

OTHER REFERENCES

"Carbowax" Polyethylene glycols, carbide & carbon, New York, N.Y., 1952, p. 19.

MAYER WEINBLATT, Primary Examiner

U.S. Cl. X.R.

134—3; 252—100, 136, 142, 143

UNITED STATES PATENT OFFICE
CERTIFICATE OF CORRECTION

Patent No. 3,681,141          Dated August 1, 1972

Inventor(s) Erland L. Muoio

It is certified that error appears in the above-identified patent and that said Letters Patent are hereby corrected as shown below:

Column 3, line 55, "39.00" should read -- 39.99 --.

Signed and sealed this 19th day of December 1972.

(SEAL)
Attest:

EDWARD M. FLETCHER, JR.           ROBERT GOTTSCHALK
Attesting Officer                  Commissioner of Patents